Patented May 23, 1944

2,349,338

UNITED STATES PATENT OFFICE 2,349,338

NONCORROSIVE HEAT-TRANSFER LIQUID

Leo J. Clapsadle, Buffalo, and Gordon B. Graham, Kenmore, N. Y., assignors to Carbide and Carbon Chemicals Corporation, a corporation of New York No Drawing. Application June 8, 1940, Serial No. 339,494

11 Claims. (Cl. 252—75)

The invention relates to new heat-transfer liquid compositions which have non-corrosive properties, and are especially adapted for use in the fluid cooling systems of internal combustion engines. It is particularly concerned with improved corrosion inhibitors for protecting the metals of a cooling system in contact with heat-transfer liquids, including those composed of an alcohol as a freezing point depressant.

Alcohols are commonly used in anti-freeze cooling fluids, including both monohydric and polyhydric compounds, such as methanol, ethanol, propanol, the glycols, polyglycols, and glycerol. The polyhydric alcohols and their derivatives, sometimes in mixture with other high boiling, low freezing liquids have also been proposed as so-called high temperature coolants. The present invention, in its broadest aspect, is applicable to any of these heat-transfer fluids, both in aqueous solution or in concentrated form, and in alcohol anti-freeze solutions a particular advantage ensues.

Pure alcohols, and other suitable non-aqueous coolants, are not inherently corrosive toward metals, but under conditions of use in cooling systems numerous factors are commonly encountered through which a corrosive action may be induced in the heat-transfer liquid. The fluid in circulation, usually after dilution to varying degrees with water, is constantly subjected to agitation in the presence of air. This aeration, coupled often with general or localized overheating, leakage of exhaust gas and other foreign materials into the system, and numerous other factors, are conducive to reactions which may cause metal corrosion. It has, therefore, become customary to add inhibitors to alcohol anti-freeze and high temperature coolants for the purpose of preventing or counteracting induced corrosive conditions. Many materials have been proposed as additive inhibitor agents, but the need still exists for a more complete and satisfactory protection for all metals of a cooling system, which usually contains in its structure iron, brass, copper, solder and aluminum.

It is an object of this invention to provide improved corrosion inhibitors for heat-transfer liquids which will repress or prevent induced corrosive conditions, and more effectively protect all metals of a cooling system. A further object is to provide improved heat-transfer liquids, particularly those of an alcohol anti-freeze type, of more permanent non-corrosive properties.

We have found that silicic acid esters of monohydric and polyhydric alcohols exhibit as a class an excellent corrosion preventive action in alcohol anti-freeze liquids and other cooling fluids, and will effectively protect all metals of the usual cooling system. Numerous compounds are operative within the broader scope of the invention, including alkyl silicates, such as methyl silicate, ethyl silicate, butyl silicate, and amyl silicate; aryl silicates, as represented by benzyl silicate; and various glycol and glycerol silicate ester derivatives. Effective inhibitor concentrations of these esters will vary with different heat-transfer compositions, but only small amounts are usually necessary, within a broad range of about 0.01% to 1.0% by weight of the concentrated alcohol or undiluted coolant, or more specifically from about 0.05% to 0.3% by weight.

While certain of the properties of the organo-silicon esters are known, few of them are at present available commercially, although sufficient tests have been made to indicate clearly an inhibitor function in the entire group. Ethyl silicate, or more specifically tetraethyl ortho silicate, is probably better known than others of these compounds, and for that reason, as well as because of its excellent corrosion preventive action, is a preferred inhibitor. Tetraethylene glycol silicate is another specific compound equally effective to ethyl silicate. These esters exert their protective action in aqueous or non-aqueous cooling compositions, and in neutral or alkaline solutions. They have a tendency, however, to hydrolyze rapidly in water solutions, forming colloidal suspensions of a highly hydrated silicon compound, and this is of advantage in obtaining a most uniform distribution of the inhibitor. In alcohol cooling fluids, for example, the ester may be added to the concentrated alcohol, and upon dilution with water to form the usual anti-freeze composition, the hydrolyzed product becomes very uniformly distributed throughout the cooling fluid. Alkaline conditions will more readily promote this hydrolysis, and alkaline reacting materials, such as sodium hydroxide or triethanolamine, are therefore preferably added to an alcohol anti-freeze, in an amount sufficient to create a pH value of from about 9.0 to 12.0 in the cooling solution. Ethyl silicate is soluble in the concentrated monohydric alcohols, such as methanol and ethanol, and a particularly advantageous use of these inhibitors will thus be found in the volatile alcohol anti-freeze liquids. This does not, however, preclude the use of the compounds in glycols or their derivatives, and other high boiling, low freezing coolants, where the silicon ester may or may not be soluble, and provides effective metal protection either in the concentrated coolant, or as hydrolyzed in aqueous solutions.

The protective action of the new inhibitors toward solder is especially noted, and use of the organo-silicon esters particularly for this purpose, in conjunction with other inhibitors, may be desirable. The invention, in fact, contemplates mixtures of the esters with other, and known, inhibitor materials, including, for example, nitrites, nitrates, alkaline buffer materials, or anti-leak and anti-foam agents. A specific formula containing additional inhibitor materials, which has proven especially effective in a cooling fluid containing methanol as the freezing point depressant, consists in percentage by weight of the alcohol of 0.3% sodium nitrite, 0.03% sodium nitrate, 0.075% sodium hydroxide, and 0.1% tetraethyl ortho silicate. Another representative methanol anti-freeze coolant contains 0.20% ethyl silicate and 0.15% sodium hydroxide, with no other additive corrosion inhibitor. In ethylene glycol cooling fluids amounts of ethyl silicate as shown in the two above formulae give equally effective corrosion protection, and similar quantities of tetraethylene glycol silicate are also suitable with any of the usual alcohol coolants, where again additional inhibitor agents may be added, if desired.

Many variations in specific formulae will be evident, and for different alcohols or other coolants the preferred concentrations of the essential silicon ester inhibitor can be readily determined. Such modifications are intended to be included within the broader scope of the invention, as are many different formulae in which other inhibitors may be employed along with the essential one of this disclosure.

We claim:

1. A non-corrosive heat-transfer liquid comprising an aqueous solution of an alcohol, and an inhibitor containing as the essential corrosion preventive the hydrolyzed product of a silicic acid ester of a member of the group consisting of monohydric and polyhydric alcohols, said ester being present initially in the unhydrolyzed state in an amount not substantially greater than 1.0% by weight of the alcohol in the heat-transfer liquid.

2. A non-corrosive heat-transfer liquid comprising an aqueous solution of an alcohol, and an inhibitor containing as the essential corrosion preventive the hydrolyzed product of a silicic acid ester of a member of the group consisting of monohydric and polyhydric alcohols, said ester being present initially in the unhydrolyzed state in an amount of about 0.01% to 1.0% by weight of the alcohol in the heat-transfer liquid.

3. A non-corrosive heat-transfer liquid comprising an aqueous solution of an alcohol, and an inhibitor containing as the essential corrosion preventive the hydrolyzed product of ethyl silicate, said ethyl silicate being present initially in the unhydrolyzed state in an amount of about 0.01% to 1.0% by weight of the alcohol.

4. A non-corrosive heat-transfer liquid comprising an aqueous solution of an alcohol, and an inhibitor containing as the essential corrosion preventive the hydrolyzed product of tetraethylene glycol silicate, said tetraethylene glycol silicate being present initially in the unhydrolyzed state in an amount of about 0.01% to 1.0% by weight of the alcohol.

5. A non-corrosive heat-transfer liquid comprising an aqueous solution of an alcohol, and an inhibitor consisting essentially of a mixture of the hydrolyzed product of a silicic acid ester of a member of the group consisting of monohydric and polyhydric alcohols, said ester being present initially in the unhydrolyzed state in an amount of about 0.01% to 1.0% by weight of the alcohol in the heat-transfer liquid, and an alkaline component, the latter in sufficient amount to create a pH value of from about 9.0 to 12.0.

6. A non-corrosive heat-transfer liquid comprising an aqueous solution of a monohydric alcohol, and an inhibitor consisting essentially of a mixture of the hydrolyzed product of tetraethyl ortho silicate, sodium nitrite, sodium nitrate, and sodium hydroxide.

7. A non-corrosive heat-transfer liquid comprising an aqueous solution of methanol, and an inhibitor consisting essentially of a mixture of the hydrolyzed product of tetraethyl ortho silicate, said silicate being present initially in the unhydrolyzed state in an amount of about 0.1% by weight of the methanol, about 0.3% sodium nitrite, about 0.03% sodium nitrate, and about 0.075% sodium hydroxide.

8. Method of inhibiting corrosion of metals by an aqueous alcohol cooling fluid in contact therewith, which comprises contacting said fluid with the metal in the presence of an inhibitor containing as the essential corrosion preventive the hydrolyzed product of a silicic acid ester of a member of the group consisting of monohydric and polyhydric alcohols, said ester being present initially in the unhydrolyzed state in an amount not substantially greater than 1.0% by weight of the alcohol in the cooling fluid.

9. Method of inhibiting corrosion of metals by an aqueous alcohol cooling fluid in contact therewith, which comprises contacting said fluid with the metal in the presence of an inhibitor containing as the essential corrosion preventive the hydrolyzed product of a member of the group consisting of ethyl silicate and tetraethylene glycol silicate, said silicate being present initially in the unhydrolyzed state in an amount of about 0.01% to 1.0% by weight of the alcohol.

10. Method of inhibiting corrosion of metals by an aqueous alcohol cooling fluid in contact therewith, which comprises contacting said fluid with the metal in the presence of an inhibitor consisting essentially of a mixture of the hydrolyzed product of ethyl silicate, said silicate being present initially in the unhydrolyzed state in an amount of about 0.01% to 1.0% by weight of the alcohol, and an alkaline compound, the latter in sufficient amount to create a pH value of from about 9.0 to 12.0 in the cooling fluid.

11. Method of inhibiting corrosion of metals by an aqueous monohydric alcohol cooling fluid in contact therewith, which comprises contacting said fluid with the metal in the presence of an inhibitor consisting essentially of a mixture of the hydrolyzed product of tetraethyl ortho silicate, sodium nitrite, sodium nitrate, and sodium hydroxide.

LEO J. CLAPSADLE.
GORDON B. GRAHAM.